US012221768B2

(12) United States Patent
Nagao et al.

(10) Patent No.: US 12,221,768 B2
(45) Date of Patent: Feb. 11, 2025

(54) HYDRAULIC SYSTEM FOR WORKING MACHINE

(71) Applicant: KUBOTA CORPORATION, Osaka (JP)

(72) Inventors: Kohei Nagao, Sakai (JP); Yuji Fukuda, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/404,935

(22) Filed: Jan. 5, 2024

(65) Prior Publication Data

US 2024/0151004 A1 May 9, 2024

Related U.S. Application Data

(63) Continuation of application No. 17/837,255, filed on Jun. 10, 2022, now Pat. No. 11,898,327.

(30) Foreign Application Priority Data

Sep. 8, 2021 (JP) ................................ 2021-146278

(51) Int. Cl.
*E02F 9/22* (2006.01)
*E02F 9/20* (2006.01)
(Continued)

(52) U.S. Cl.
CPC .......... *E02F 9/2228* (2013.01); *E02F 9/2004* (2013.01); *E02F 9/2285* (2013.01);
(Continued)

(58) Field of Classification Search
CPC ........... F15B 2211/355; F15B 2211/36; F15B 2211/6316
See application file for complete search history.

(56) References Cited

U.S. PATENT DOCUMENTS 5,835,874 A * 11/1998 Hirata ..................... E02F 3/301 60/426
11,898,327 B2 * 2/2024 Nagao .................. F15B 13/044
(Continued)

FOREIGN PATENT DOCUMENTS

GB 2581928 A * 9/2020 ............. E02F 3/422
JP 2019210091 A 12/2019

OTHER PUBLICATIONS

Official Communication issued in corresponding Japanese Patent Application No. 2021-146278 mailed on Apr. 23, 2024, 4 pages.
(Continued)

*Primary Examiner* — Thomas E Lazo
(74) *Attorney, Agent, or Firm* — Keating & Bennett, LLP

(57) ABSTRACT

In a working machine, a controller is configured or programmed to control actuation of a blocking switching valve and a solenoid valve, to cause the blocking switching valve to unblock a first pilot fluid passage to perform switching to a first operation pattern in which an operation device operates a first device via a first control valve and a first hydraulic actuator, and cause the blocking switching valve to block a second pilot fluid passage and control the solenoid valve based on pilot pressure detected by a pressure detector to perform switching to a second operation pattern in which the operation device operates a second device via a second control valve and a second hydraulic actuator.

8 Claims, 4 Drawing Sheets

(51) Int. Cl.
*F15B 13/044* (2006.01)
*F15B 15/20* (2006.01)

(52) U.S. Cl.
CPC ............ *F15B 13/044* (2013.01); *F15B 15/20* (2013.01); *E02F 9/2292* (2013.01)

(56) References Cited

U.S. PATENT DOCUMENTS

| | | | | |
|---|---|---|---|---|
| 2015/0292184 | A1* | 10/2015 | Kondo | F15B 13/0426<br>91/518 |
| 2016/0215475 | A1* | 7/2016 | Meguriya | E02F 9/2285 |
| 2016/0230370 | A1* | 8/2016 | Fukuda | F16H 61/4008 |
| 2019/0101138 | A1* | 4/2019 | Fukuda | F15B 11/16 |
| 2020/0048868 | A1* | 2/2020 | Nishimoto | E02F 9/2228 |
| 2021/0156109 | A1* | 5/2021 | Kondo | E02F 9/22 |
| 2023/0092677 | A1* | 3/2023 | Fukuda | E02F 9/2296<br>60/422 |

OTHER PUBLICATIONS

Nagao et al., “Hydraulic System for Working Machine”, U.S. Appl. No. 17/837,255, filed Jun. 10, 2022.

* cited by examiner

HYDRAULIC SYSTEM FOR WORKING MACHINE

CROSS REFERENCE TO RELATED APPLICATIONS

This application claims the benefit of priority to Japanese Patent Application No. 2021-146278 filed on Sep. 8, 2021 and is a Continuation Application of U.S. patent application Ser. No. 17/837,255 (currently pending), the entire contents of each of these applications are hereby incorporated herein by reference.

BACKGROUND OF THE INVENTION

1. Field of the Invention

The present invention relates to a hydraulic system for a working machine, such as a skid-steer loader, a compact track loader, or a backhoe.

2. Description of the Related Art

Japanese Unexamined Patent Application Publication No. 2020-26819 discloses a hydraulic system that increases the flow rate of a hydraulic fluid to be supplied to a hydraulic actuator in a working machine. The hydraulic system disclosed in Japanese Unexamined Patent Application Publication No. 2020-26819 includes a first hydraulic pump and a second hydraulic pump each of which is a fixed displacement pump and outputs a hydraulic fluid, a hydraulic actuator, a first fluid passage that connects the first hydraulic pump and the hydraulic actuator, a second fluid passage that connects the second hydraulic pump and the first fluid passage, a first control valve, a second control valve, and a controller.

The first control valve includes a spool movable between a first supply position at which a hydraulic fluid output from the first hydraulic pump to the first fluid passage is supplied to the hydraulic actuator and a first stop position at which the hydraulic fluid output to the first fluid passage is not supplied to the hydraulic actuator, and is capable of changing, by movement of the spool, the flow rate of the hydraulic fluid to be supplied to the first fluid passage. The second control valve is switchable between a second supply position at which a hydraulic fluid output from the second hydraulic pump to the second fluid passage is supplied to the first fluid passage and a second stop position at which the hydraulic fluid output to the second fluid passage is not supplied to the first fluid passage. A moving speed at which the spool moves from the first supply position to the first stop position when the second control valve is at the second supply position is defined as a first moving speed, and a moving speed at which the spool moves from the first supply position to the first stop position when the second control valve is at the second stop position is defined as a second moving speed. In this case, the controller causes the first moving speed to be lower than the second moving speed.

SUMMARY OF THE INVENTION

In the hydraulic system for the working machine disclosed in Japanese Unexamined Patent Application Publication No. 2020-26819, the control valves are switched using a hydraulic pilot method. That is, the hydraulic-pilot-operated hydraulic system includes a dedicated hydraulic circuit to control the flow of a pilot fluid for operating the control valves. The hydraulic circuit includes an operation device including an operation lever or the like to control the flow of a pilot fluid. The hydraulic circuit is configured to operate the control valves by controlling the flow of a pilot fluid through operation of the operation device, such as operation of an operation lever. However, the operation device in the hydraulic system for the working machine according to Japanese Unexamined Patent Application Publication No. 2020-26819 is provided exclusively for operating the control valves, and has only a single operation pattern for operating the control valves. In other words, the operation device in the hydraulic system for the working machine according to Japanese Unexamined Patent Application Publication No. 2020-26819 has an issue of being unusable for operating other valves of the hydraulic system, such as a switching valve and a proportional valve, that is, the operation device is incapable of changing the operation pattern.

Example embodiments of the present invention provide hydraulic systems for working machines, each capable of changing the operation pattern of an operation device (for example, an operation lever) in a working machine adopting a hydraulic pilot method.

Example embodiments of the present invention will be described in the following.

A working machine according to an example embodiment of the present invention includes a prime mover, an actuation hydraulic pump to be driven by the prime mover to output hydraulic fluid, a pilot hydraulic pump to be driven by the prime mover to output pilot fluid, a first control valve to be actuated by the pilot fluid to control supply of the hydraulic fluid to a first hydraulic actuator to cause the first hydraulic actuator to actuate a first device, a second control valve to be actuated by the pilot fluid to control supply of the hydraulic fluid to a second hydraulic actuator to cause the second hydraulic actuator to actuate a second device, an operation device to allow the pilot fluid to be output based on an operation state of the operation device, a first pilot fluid passage to allow the pilot fluid to be supplied from the operation device to the first control valve, a second pilot fluid passage to allow the pilot fluid to be supplied from the operation device to the second control valve, a pressure detector to detect a pilot pressure which is a pressure of the pilot fluid in the first pilot fluid passage, a blocking switching valve provided in the first pilot fluid passage, a solenoid valve provided in the second pilot fluid passage, and a controller configured or programmed to control actuation of the blocking switching valve and the solenoid valve, cause the blocking switching valve to unblock the first pilot fluid passage to perform switching to a first operation pattern in which the operation device operates the first device via the first control valve and the first hydraulic actuator, and cause the blocking switching valve to block the second pilot fluid passage and control the solenoid valve based on the pilot pressure detected by the pressure detector to perform switching to a second operation pattern in which the operation device operates the second device via the second control valve and the second hydraulic actuator.

The working machine may further include a plurality of the first pilot fluid passages, and a plurality of the pressure detectors which are pressure sensors provided in the respective plurality of first pilot fluid passages between the operation device and the blocking switching valve.

The working machine may further include a third control valve to be actuated by the pilot fluid to control supply of the hydraulic fluid to a third hydraulic actuator to cause the third hydraulic actuator to actuate a third device, and a third pilot fluid passage to allow the pilot fluid to be supplied from the operation device to the third control valve, wherein the operation device may be configured to operate the first device via the first control valve and the first hydraulic actuator in the first operation pattern and the second operation pattern.

The working machine may further include an operator's seat to allow an operator to be seated, wherein the operation device may include an operation lever adjacent to the operator's seat to be operated in a plurality of directions, and pilot valves to change a pressure of the pilot fluid based on a direction and amount of operation of the operation lever.

The solenoid valve may include a proportional valve, and the controller may be configured or programmed to, after performing switching to the second operation pattern, control the proportional valve based on the pilot pressure detected by the pressure detector to change a pressure of the pilot fluid acting on the second control valve to actuate the second control valve.

The working machine may further include a working device attached to a machine body, wherein the working device may include a boom, a working tool attached to the boom, and a hydraulic cylinder to swing the working tool, wherein the first device may be the working tool, the first hydraulic actuator may be the hydraulic cylinder, the second device may be an attachment attached to the boom, and the second hydraulic actuator may be an auxiliary actuator attached to the attachment.

The working machine may further include a working device attached to a machine body, wherein the working device may include a boom, and a boom cylinder to raise and lower the boom, the third device may be the boom, and the third hydraulic actuator may be the boom cylinder.

The working machine may further include an operation pattern switch, wherein the controller may be configured or programmed to actuate the blocking switching valve based on an operation state of the operation pattern switch to perform switching to the first operation pattern or the second operation pattern.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
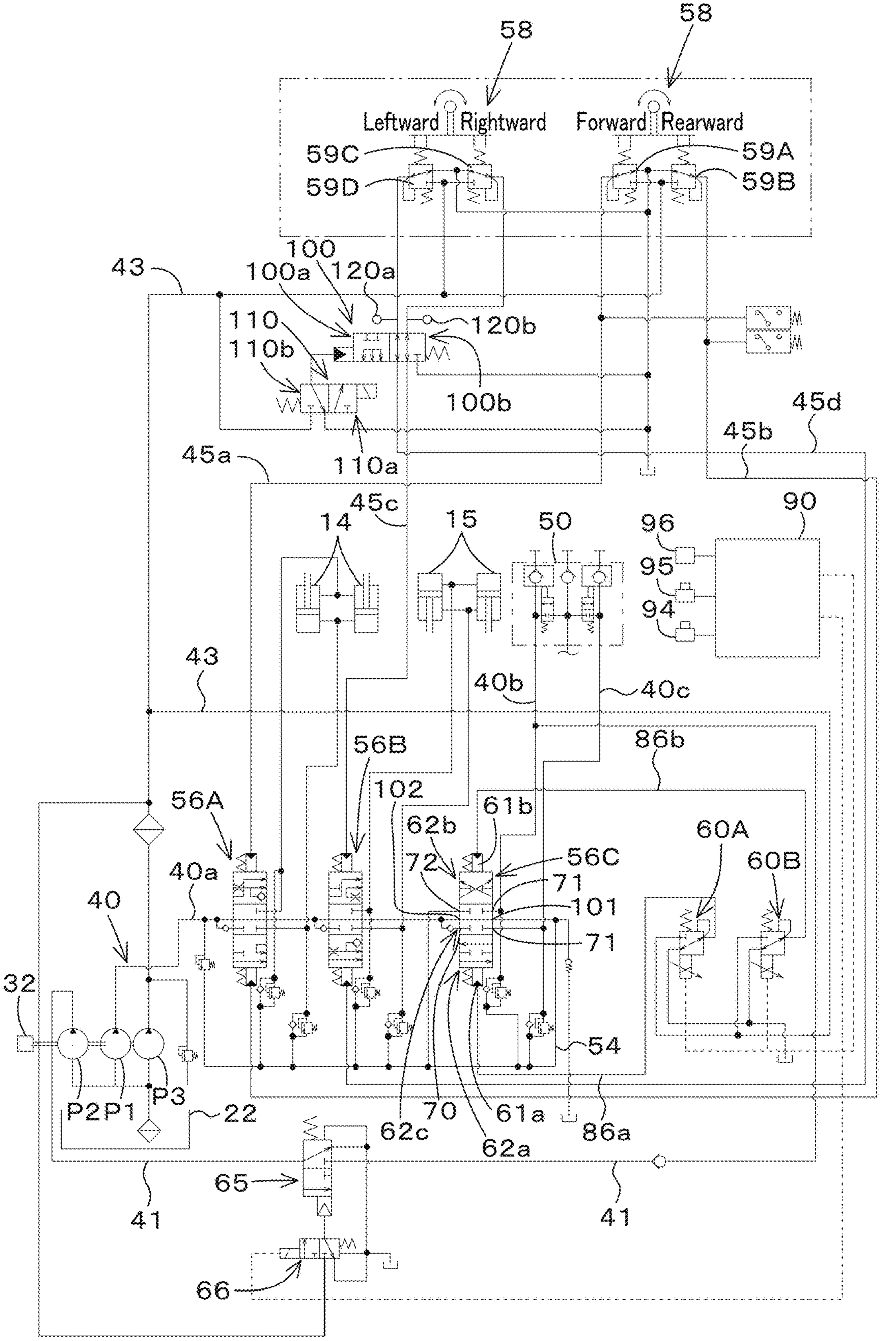
FIG. 1 is a schematic diagram of a hydraulic system for a working machine according to an example embodiment of the present invention.

The example embodiments will now be described with reference to the accompanying drawings, wherein like reference numerals designate corresponding or identical elements throughout the various drawings. The drawings are to be viewed in an orientation in which the reference numerals are viewed correctly.

Hereinafter, example embodiments of the present invention will be described with reference to the drawings.

Figure 4:
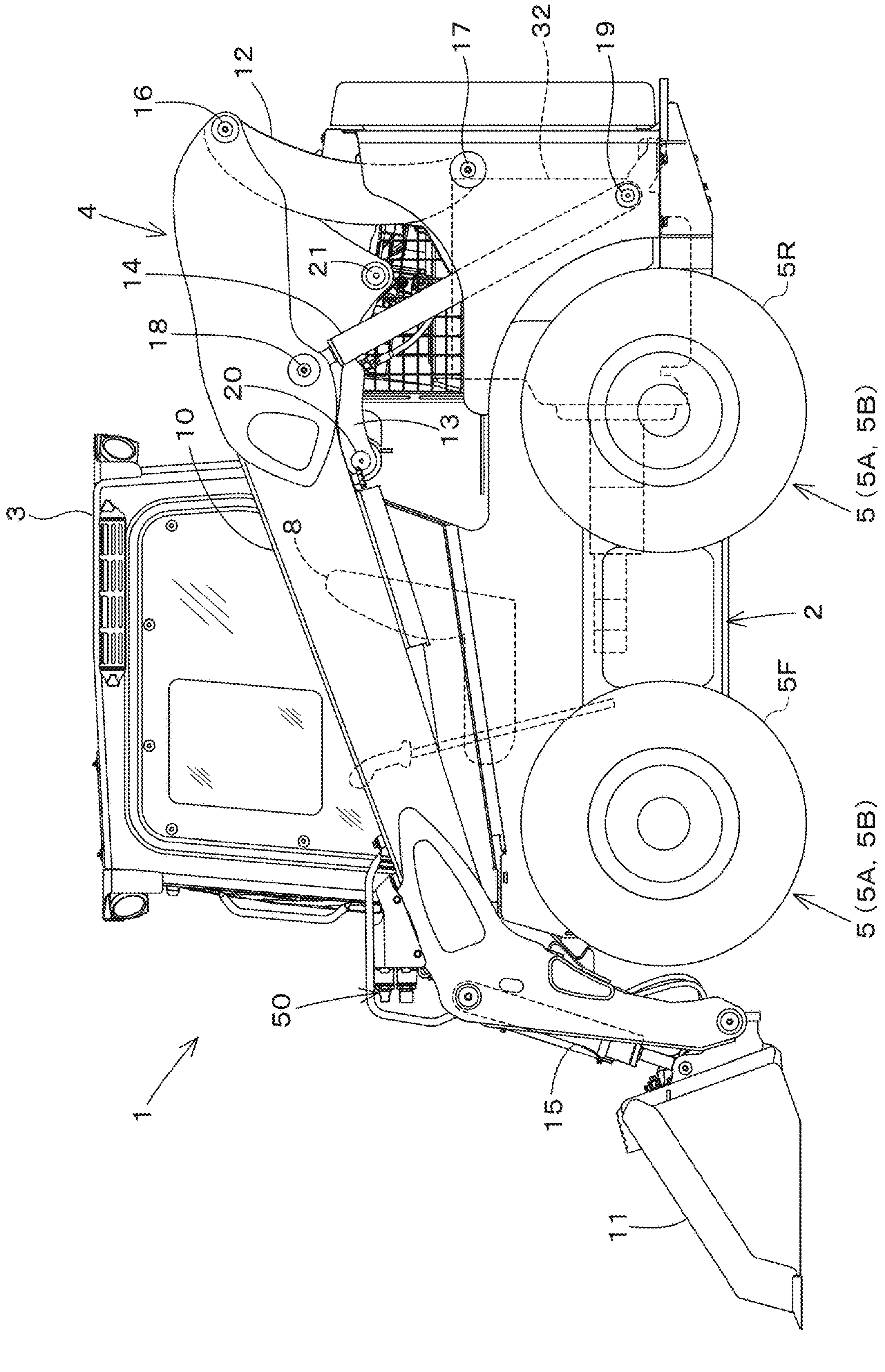
FIG. 4 is a side view illustrating a skid-steer loader, which is an example of the working machine according to an example embodiment of the present invention.

FIG. 4 is a side view illustrating a working machine according to an example embodiment of the present invention. FIG. 4 illustrates a skid-steer loader as an example of the working machine. The working machines according to example embodiments of the present invention are not limited to the skid-steer loader, and may be another type of loader working machine, such as a compact track loader. The working machines according to the example embodiments of the present invention may be a working machine other than a loader working machine.

As illustrated in FIG. 4, a working machine 1 includes a machine body 2, a cabin 3, a working device 4, and a traveling device 5. In the present example embodiment of the present invention, a forward direction corresponds to a forward direction of an operator seated on an operator's seat 8 of the working machine 1 (the left side in FIG. 4), a rearward direction corresponds to a rearward direction of the operator (the right side in FIG. 4), a leftward direction corresponds to a leftward direction of the operator, and a rightward direction corresponds to a rightward direction of the operator. A machine-body-width direction corresponds to a horizontal direction that is orthogonal to a forward-rearward direction. A machine-body-outward direction corresponds to a rightward or leftward direction from a central portion of the machine body 2. In other words, the machine-body-outward direction is the machine-body-width direction and is a direction away from the machine body 2. A machine-body-inward direction corresponds to a direction opposite to the machine-body-outward direction. In other words, the machine-body-inward direction is the machine-body-width direction and is a direction approaching the machine body 2.

The cabin 3 is mounted on the machine body 2. The cabin 3 includes the operator's seat 8. The working device 4 is attached to the machine body 2. The traveling device 5 is provided on an outer side of the machine body 2. A prime mover 32 is mounted in a rear portion of the machine body 2 inside the machine body 2. The prime mover 32 includes an electric motor, an engine (internal combustion engine), or the like. In the present example embodiment, the prime mover 32 is an engine.

The working device 4 includes a pair of booms 10, a working tool 11, a pair of lift links 12, a pair of control links 13, a pair of boom cylinders 14, and a pair of bucket cylinders 15. The pair of booms 10 are provided on the right side and the left side of the cabin 3 so as to be swingable up and down. The working tool 11 is, for example, a bucket, and will be hereinafter referred to as a bucket 11. The bucket 11 is provided at distal end portions (front end portions) of the pair of booms 10 so as to be swingable up and down.

As illustrated in FIG. 4, in accordance with the boom 10 provided on the left side of the cabin 3, the lift link 12, the control link 13, the boom cylinder 14, and the bucket cylinder 15 are provided on the left side of the cabin 3. Although not illustrated in FIG. 4, in accordance with the boom 10 provided on the right side of the cabin 3, the lift link 12, the control link 13, the boom cylinder 14, and the bucket cylinder 15 are provided on the right side of the cabin 3. Front portions of the right and left booms 10 are coupled to each other by an odd-shaped coupling pipe. Base portions (rear portions) of the booms 10 are coupled to each other by a circular coupling pipe.

Hereinafter, a description will be given of the boom 10, the lift link 12, the control link 13, the boom cylinder 14, and the bucket cylinder 15 provided on the left side of the cabin 3.

The lift link 12 and the control link 13 support the base portion (rear portion) of the boom 10 such that the boom 10 is swingable up and down. The boom cylinder 14 extends or contracts to raise or lower the boom 10. The bucket cylinder 15 extends or contracts to swing the bucket 11.

The lift link 12 is provided upright at a rear portion of the base portion of the boom 10. An upper portion (one end) of the lift link 12 is pivotally supported via a first pivot shaft 16 so as to be rotatable about a lateral axis defined by the first pivot shaft 16, in the rear portion of the base portion of the boom 10. A lower portion (the other end) of the lift link 12 is pivotally supported via a second pivot shaft 17 so as to be rotatable about a lateral axis defined by the second pivot shaft 17, in the rear portion of the machine body 2. The second pivot shaft 17 is provided below the first pivot shaft 16.

An upper portion of the boom cylinder 14 is pivotally supported via a third pivot shaft 18 so as to be rotatable about a lateral axis defined by the third pivot shaft 18. The third pivot shaft 18 is provided in a front portion of the base portion of the boom 10. A lower portion of the boom cylinder 14 is pivotally supported via a fourth pivot shaft 19 so as to be rotatable about a lateral axis defined by the fourth pivot shaft 19. The fourth pivot shaft 19 is provided in a lower portion of the rear portion of the machine body 2 and below the third pivot shaft 18.

The control link 13 is provided in front of the lift link 12. One end of the control link 13 is pivotally supported via a fifth pivot shaft 20 so as to be rotatable about a lateral axis defined by the fifth pivot shaft 20. The fifth pivot shaft 20 is provided at a position in front of the lift link 12 in the machine body 2. The other end of the control link 13 is pivotally supported via a sixth pivot shaft 21 so as to be rotatable about a lateral axis defined by the sixth pivot shaft 21. The sixth pivot shaft 21 is provided in front of and above the second pivot shaft 17 in the boom 10.

Extending and contracting of the boom cylinder 14 causes the boom 10 to swing up and down about the first pivot shaft 16, and the distal end portion of the boom 10 to be raised and lowered, while the base portion of the boom 10 is supported by the lift link 12 and the control link 13. When the boom 10 swings up and down, the control link 13 swings up and down about the fifth pivot shaft 20. When the control link 13 swings up and down, the lift link 12 swings back and forth about the second pivot shaft 17. The bucket cylinder 15 is disposed near the front portion of the boom 10. Extending and contracting of the bucket cylinder 15 causes the bucket 11 to swing.

The configuration of the boom 10, the lift link 12, the control link 13, the boom cylinder 14, and the bucket cylinder 15 provided on the left side of the cabin 3 has been described above. The boom 10, the lift link 12, the control link 13, the boom cylinder 14, and the bucket cylinder 15 provided on the right side of the cabin 3 have a configuration similar to that described above.

In the front portion of the left boom 10, a connection member 50 (see FIG. 1) is provided. The connection member 50 is connected to a piping material, such as a pipe, connected to an auxiliary actuator equipped in an auxiliary attachment.

A working tool other than the bucket 11 may be attached to the front portions of the booms 10. Examples of the other working tool include attachments (auxiliary attachments), such as a hydraulic crusher, a hydraulic breaker, an angle broom, an earth auger, a pallet fork, a sweeper, a mower, and a snow blower.

In the present example embodiment, the traveling device 5 includes a wheel-type traveling device SA on the left and a wheel-type traveling device SB on the right, each including a front wheel SF and a rear wheel SR. Alternatively, crawler (including semi-crawler) traveling devices may be adopted as the traveling devices SA and SB.

As illustrated in FIG. 1, a hydraulic system for a working machine includes a first hydraulic pump P1, a second hydraulic pump P2, and a third hydraulic pump P3.

Each of the first hydraulic pump P1, the second hydraulic pump P2, and the third hydraulic pump P3 is a pump driven by the power of the prime mover 32 and includes a fixed displacement gear pump. The first hydraulic pump P1 is capable of outputting a hydraulic fluid stored in a hydraulic fluid tank 22. The first hydraulic pump P1 outputs a hydraulic fluid for mainly operating a hydraulic actuator. A first fluid passage 40 is provided at an output port that outputs a hydraulic fluid in the first hydraulic pump P1.

The second hydraulic pump P2 is a pump that is capable of outputting a hydraulic fluid stored in the hydraulic fluid tank 22 and that increases the amount of hydraulic fluid for the hydraulic actuator. A second fluid passage 41 is provided at an output port that outputs a hydraulic fluid in the second hydraulic pump P2.

The third hydraulic pump P3 is capable of outputting a hydraulic fluid stored in the hydraulic fluid tank 22. In particular, the third hydraulic pump P3 outputs a hydraulic fluid to be mainly used for control. A third fluid passage 43 is provided at an output port that outputs a hydraulic fluid in the third hydraulic pump P3. For convenience of description, the hydraulic fluid output from the third hydraulic pump P3 will be referred to as a pilot fluid, and the pressure of the pilot fluid will be referred to as a pilot pressure.

A boom control valve 56A, a bucket control valve (working tool control valve) 56B, which is a first control valve, and an auxiliary control valve 56C, which is a second control valve, are connected to the first fluid passage 40. The boom control valve 56A is a valve that controls hydraulic cylinders to control the booms 10 (boom cylinders 14). The bucket control valve 56B is a valve that controls hydraulic cylinders to control the bucket 11 (bucket cylinders 15). The auxiliary control valve 56C is a valve that controls an auxiliary actuator (hydraulic cylinder, hydraulic motor) equipped in an auxiliary attachment, such as a hydraulic crusher, a hydraulic breaker, an angle broom, an earth auger, a pallet fork, a sweeper, a mower, or a snow blower.

The boom control valve 56A and the bucket control valve 56B are each a pilot-operated direct-acting spool three-position switching valve. The boom control valve 56A and the bucket control valve 56B are switched by a pilot pressure to a neutral position, a first position different from the neutral position, or a second position different from the neutral position and the first position.

The boom cylinders 14 are connected to the boom control valve 56A via fluid passages, and the bucket cylinders 15 are connected to the bucket control valve 56B via fluid passages.

The booms 10 and the bucket 11 can be operated by an operation lever 58, which is an operation device, provided near the operator's seat 8. The operation lever 58 is supported so as to be tiltable in a forward-rearward direction, a rightward-leftward direction, and an oblique direction from a neutral position. A tilting operation of the operation lever 58 makes it possible to operate a plurality of pilot valves (operation valves) 59A, 59B, 59C, and 59D provided below the operation lever 58. The pilot valves 59A, 59B, 59C, and 59D are connected to the third hydraulic pump P3 by the third fluid passage 43.

The plurality of pilot valves (operation valves) 59A, 59B, 59C, and 59D are connected to the boom control valve 56A and the bucket control valve (working tool control valve) 56B by a plurality of fluid passages 45*a*, 45*b*, 45*c*, and 45*d*. Specifically, the pilot valve 59A is connected to the boom control valve 56A via the fluid passage 45*a*. The pilot valve 59B is connected to the boom control valve 56A via the fluid passage 45*b*. The pilot valve 59C is connected to the bucket control valve 56B via the fluid passage 45*c*, which is a first pilot fluid passage connected to a first output port of the operation lever 58 (operation device). The pilot valve 59D is connected to the bucket control valve 56B via the fluid passage 45*d*, which is a second pilot fluid passage connected to a second output port of the operation lever 58 (operation device). For each of the pilot valves (operation valves) 59A, 59B, 59C, and 59D, the pressure of the hydraulic fluid to be output can be set in accordance with an operation of the operation lever 58.

Specifically, upon the operation lever 58 being tilted forward, the pilot valve (operation valve) 59A for lowering is operated, and a pilot pressure to be output from the pilot valve 59A for lowering is set. The pilot pressure acts on a pressure receiver of the boom control valve 56A to contract the boom cylinders 14, and thus the booms 10 are lowered.

Upon the operation lever 58 being tilted rearward, the pilot valve (operation valve) 59B for raising is operated, and a pilot pressure to be output from the pilot valve 59B for raising is set. The pilot pressure acts on the pressure receiver of the boom control valve 56A to extend the boom cylinders 14, and thus the booms 10 are raised.

Upon the operation lever 58 being tilted rightward (in a first direction), the pilot valve (operation valve) 59C for bucket dumping is operated, and a pilot pressure to be output from the first output port, which is an output port of the pilot valve 59C, is set. The first output port outputs a hydraulic fluid (that is, a pilot pressure) in accordance with an amount of operation of the operation lever 58 in the first direction. The pilot pressure acts on a pressure receiver of the bucket control valve 56B to extend the bucket cylinders 15, and thus the bucket 11 dumps.

Upon the operation lever 58 being tilted leftward (in a second direction), the pilot valve (operation valve) 59D for bucket shoveling is operated, and a pilot pressure to be output from the second output port, which is an output port of the pilot valve 59D, is set. The second output port outputs a hydraulic fluid (that is, a pilot pressure) in accordance with an amount of operation of the operation lever 58 in the second direction. The pilot pressure acts on the pressure receiver of the bucket control valve 56B to contract the bucket cylinders 15, and thus the bucket 11 shovels.

The hydraulic system for the working machine according to the present example embodiment includes a second control valve that controls the flow rate of a hydraulic fluid to be supplied from the first fluid passage 40 to the hydraulic actuator of the auxiliary attachment described above (hereinafter referred to as an auxiliary actuator) via the connection member 50. In the present example embodiment, the second control valve is the auxiliary control valve 56C, and the hydraulic actuator is an auxiliary actuator. Hereinafter, a description will be given under the assumption that the second control valve is the auxiliary control valve 56C.

The first fluid passage 40 includes a first section 40*a* that connects the first hydraulic pump P1 and the auxiliary control valve 56C, and at least two second sections 40*b* and 40*c* connected to the auxiliary control valve 56C.

The auxiliary control valve 56C includes an input port (first input port) 70, an input port (second input port) 102, an output port 71, a tank port (first tank port) 72, and a tank port (second tank port) 101. The input port 70 is a port to which the first section 40*a* of the first fluid passage 40 is connected and to which the hydraulic fluid output from the first hydraulic pump P1 is supplied. Similarly to the input port 70, the input port 102 is a port to which the first section 40*a* of the first fluid passage 40 is connected and to which the hydraulic fluid output from the first hydraulic pump P1 is supplied, and is a port different from the input port 70. The output port 71 is a port to which the second sections 40*b* and 40*c* of the first fluid passage 40 are connected, and is a port that supplies a hydraulic fluid to the auxiliary actuator. The tank port 72 is a port that discharges a hydraulic fluid, and is a port that discharges a hydraulic fluid returned from the auxiliary actuator to the auxiliary control valve 56C. A discharge fluid passage 54 is connected to the tank port 72. The discharge fluid passage 54 is connected to the hydraulic fluid tank 22, and discharges at least the hydraulic fluid discharged from the tank port 72 of the auxiliary control valve 56C to the hydraulic fluid tank 22.

The tank port 101 is a port that discharges a hydraulic fluid, and is a port that discharges at least a portion of the hydraulic fluid introduced from the input port 102 to the auxiliary control valve 56C. The tank port 101 is connected to the discharge fluid passage 54.

The auxiliary control valve 56C is a switching valve including a spool, and is, for example, a pilot-operated direct-acting spool three-position switching valve. The spool of the auxiliary control valve 56C is moved in, for example, a third direction and a fourth direction different from the third direction by the pilot pressures respectively acting on pressure receivers 61*a* and 61*b*, thereby being movable to first supply positions 62*a* and 62*b* at which a hydraulic fluid is supplied to the auxiliary actuator and a first stop position (neutral position) 62*c* at which supply of the hydraulic fluid to the auxiliary actuator is stopped. A movement of the spool of the auxiliary control valve 56C to either the first supply position 62*a* or 62*b* enables the auxiliary control valve 56C to change the flow rate of the hydraulic fluid to be output from the output port 71 of the auxiliary control valve 56C.

Pilot fluid passages 86*a* and 86*b* are connected to the pressure receivers 61*a* and 61*b* of the auxiliary control valve 56C, respectively. A first proportional valve 60A, which is a proportional valve, is provided in the pilot fluid passage 86*a*. A second proportional valve 60B, which is a proportional valve, is provided in the pilot fluid passage 86*b*. The proportional valves (first proportional valve 60A and second proportional valve 60B) are solenoid valves whose opening can be changed by energization. The third fluid passage 43 is connected to the first proportional valve 60A and the second proportional valve 60B. The first proportional valve 60A and the second proportional valve 60B are supplied with a pilot fluid from the third hydraulic pump P3. Changing of the openings of the first proportional valve 60A and the second proportional valve 60B causes a change in the pilot pressure that acts on the pressure receivers 61*a* and 61*b* of the auxiliary control valve 56C, and the spool of the auxiliary control valve 56C is moved in a certain direction accordingly.

For example, upon the first proportional valve 60A being opened, the pilot fluid acts on the pressure receiver 61*a* of the auxiliary control valve 56C via the pilot fluid passage 86*a*, and the pilot pressure to be applied to (act on) the pressure receiver 61*a* is determined by the opening of the first proportional valve 60A. In response to the pilot pressure applied to the pressure receiver 61*a* becoming a predetermined value or more, the spool of the auxiliary control valve 56C moves from the first stop position 62*c* toward the first supply position 62*a*. Upon the second proportional valve 60B being opened, the pilot fluid acts on the pressure receiver 61*b* of the auxiliary control valve 56C via the pilot fluid passage 86*b*, and the pilot pressure to be applied to (act on) the pressure receiver 61*b* is determined by the opening of the second proportional valve 60B. In response to the pilot pressure applied to the pressure receiver 61*b* becoming a predetermined value or more, the spool of the auxiliary control valve 56C moves from the first stop position 62*c* toward the first supply position 62*b*.

Energization or the like of the proportional valves 60 (first proportional valve 60A and second proportional valve 60B) is performed by a controller 90. The controller 90 includes a central processing unit (CPU) and a memory or the like.

As illustrated in FIG. 1, the hydraulic system for the working machine according to the present example embodiment includes, as characteristic components, a blocking switching valve 100, a solenoid switching valve 110 to switch the blocking switching valve 100, and pressure sensors 120*a* and 120*b*. The pressure sensors 120*a* and 120*b* are pressure detectors that measure the pilot pressure between the blocking switching valve 100 and the operation lever (operation device) 58.

The blocking switching valve 100 is provided across both the fluid passage (first pilot fluid passage) 45*c* and the fluid passage (second pilot fluid passage) 45*d* that connect the operation lever 58 and the bucket control valve 56B. The blocking switching valve 100 is a valve capable of blocking and unblocking the fluid passages 45*c* and 45*d*.

The blocking switching valve 100 is a two-position switching valve operated by a pilot pressure. The blocking switching valve 100 is switchable between two switching positions (a blocking position 100*a* and an unblocking position 100*b*) by a pilot pressure. In the blocking position 100*a*, the blocking switching valve 100 blocks the fluid passages 45*c* and 45*d* and makes the flow rate of the pilot fluid flowing to the bucket control valve 56B zero.

In the unblocking position 100*b*, the blocking switching valve 100 unblocks the fluid passages 45*c* and 45*d* and allows a pilot fluid to be supplied to the bucket control valve 56B. In other words, the blocking switching valve 100 blocks the flow of a hydraulic fluid through the fluid passages 45*c* and 45*d* when being in the blocking position 100*a*, and allows a hydraulic fluid to flow through the fluid passages 45*c* and 45*d* when being in the unblocking position 100*b*.

Thus, when the blocking switching valve 100 is in the blocking position 100*a*, the pilot fluid output from the pilot valves 59C and 59D of the operation lever 58 is blocked by the blocking switching valve 100 in the fluid passages 45*c* and 45*d*. Then, upon a pilot fluid being output from the pilot valves 59C and 59D by an operation of the operation lever 58, the hydraulic pressure in the section from the pilot valves 59C and 59D to the blocking position 100*a* increases in the fluid passages 45*c* and 45*d*.

The solenoid switching valve 110 is a solenoid switching valve connected to the third hydraulic pump P3 via the third fluid passage 43. The solenoid switching valve 110 operates on the basis of a control signal output from the controller 90. The solenoid switching valve 110 is a valve that operates the blocking switching valve 100 by switching, and includes a solenoid two-position switching valve. The solenoid switching valve 110 applies a pilot fluid (that is, a pilot pressure) supplied from the third hydraulic pump P3 to the blocking switching valve 100 to operate the blocking switching valve 100. The solenoid switching valve 110 is switchable between a first position 110*a* and a second position 110*b*. The solenoid switching valve 110 is connected to the third fluid passage 43. When being in the first position 110*a*, the solenoid switching valve 110 causes a pilot pressure to act on a pressure receiver of the blocking switching valve 100, and causes the blocking switching valve 100 to be in the blocking position 100*a*. When being in the second position 110*b*, the solenoid switching valve 110 causes a pilot pressure not to act on the pressure receiver of the blocking switching valve 100, and causes the blocking switching valve 100 to be in the unblocking position 100*b*.

Switching between the first position 110*a* and the second position 110*b* of the solenoid switching valve 110 is performed by the controller 90. An operation pattern switch 95, such as a switch that can be turned ON or OFF, is connected to the controller 90. The operation pattern switch 95 outputs an instruction to operate the solenoid switching valve 110 to the controller 90. The operation pattern switch 95 is, for example, a physical switch such as a swingable seesaw switch or a pushable push switch. When the operation pattern switch 95 is in an OFF state, the controller 90 deenergizes the solenoid of the solenoid switching valve 110. When the operation pattern switch 95 is in an ON state, the controller 90 continuously energizes the solenoid of the solenoid switching valve 110.

The operation pattern switch 95 need not necessarily be the above-described physical switch. The operation pattern switch 95 may be, for example, a soft switch that is configured or programmed by computer software and that is displayed by the controller 90 on a display device or the like provided in the working machine 1. The controller 90 is capable of displaying the operation pattern switch 95 on a touch panel (also referred to as a touch screen) or the like of the display device. Even when the operation pattern switch 95 is a soft switch displayed on the touch panel, the controller 90 deenergizes or energizes the solenoid of the solenoid switching valve 110 by turning ON or OFF the operation pattern switch 95, as described above.

In response to the solenoid of the solenoid switching valve 110 being energized, the solenoid switching valve 110 is switched to the first position 110*a*, and a pilot pressure acts on the pressure receiver of the blocking switching valve 100. Accordingly, the blocking switching valve 100 is switched to the blocking position 100*a*. In response to the solenoid of the solenoid switching valve 110 being deenergized, the solenoid switching valve 110 is switched to the second position 110*b*, and a pilot pressure stops acting on the pressure receiver of the blocking switching valve 100. Accordingly, the blocking switching valve 100 is switched to the unblocking position 100*b*.

The pressure sensor 120*b*, which is a first pressure sensor, is a sensor that is provided in the fluid passage 45*c* defining and functioning as a first pilot fluid passage, that detects a hydraulic pressure in the fluid passage 45*c* corresponding to a rightward operation of the operation lever 58 (referred to as a first pressure), and that outputs an electric signal corresponding to the detected hydraulic pressure. The pressure sensor 120*b* is disposed between the operation lever 58, which is an operation device, and the blocking switching valve 100, and is electrically connected to the controller 90. The pressure sensor 120*b* outputs an electric signal corresponding to the detected hydraulic pressure in the fluid passage 45*c* to the controller 90.

The pressure sensor 120*a*, which is a second pressure sensor, is a sensor that is provided in the fluid passage 45*d* defining and functioning as a second pilot fluid passage, that detects a hydraulic pressure in the fluid passage 45*d* corresponding to a leftward operation of the operation lever 58 (referred to as a second pressure), and that outputs an electric signal corresponding to the detected hydraulic pressure. The pressure sensor 120*a* is disposed between the operation lever 58, which is an operation device, and the blocking switching valve 100, and is electrically connected to the controller 90. The pressure sensor 120*a* outputs an electric signal corresponding to the detected hydraulic pressure in the fluid passage 45*d* to the controller 90. The controller 90 calculates hydraulic pressure values in the fluid passages 45*d* and 45*c* on the basis of the electric signals received from the pressure sensors 120*a* and 120*b*.

In the hydraulic system including the blocking switching valve 100, the solenoid switching valve 110, and the pressure sensors 120*a* and 120*b* described above, the controller 90 changes the operation target (the control valve 56A, 56B, or 56C) of the operation lever 58 in response to the operation pattern switch 95 being turned ON. In the present example embodiment, the change of the operation target is referred to as a change of the operation pattern of the operation lever 58. The change of the operation pattern makes it possible to operate not only the boom control valve 56A and the bucket control valve 56B but also the auxiliary control valve 56C by using the operation lever 58.

Figure 2:
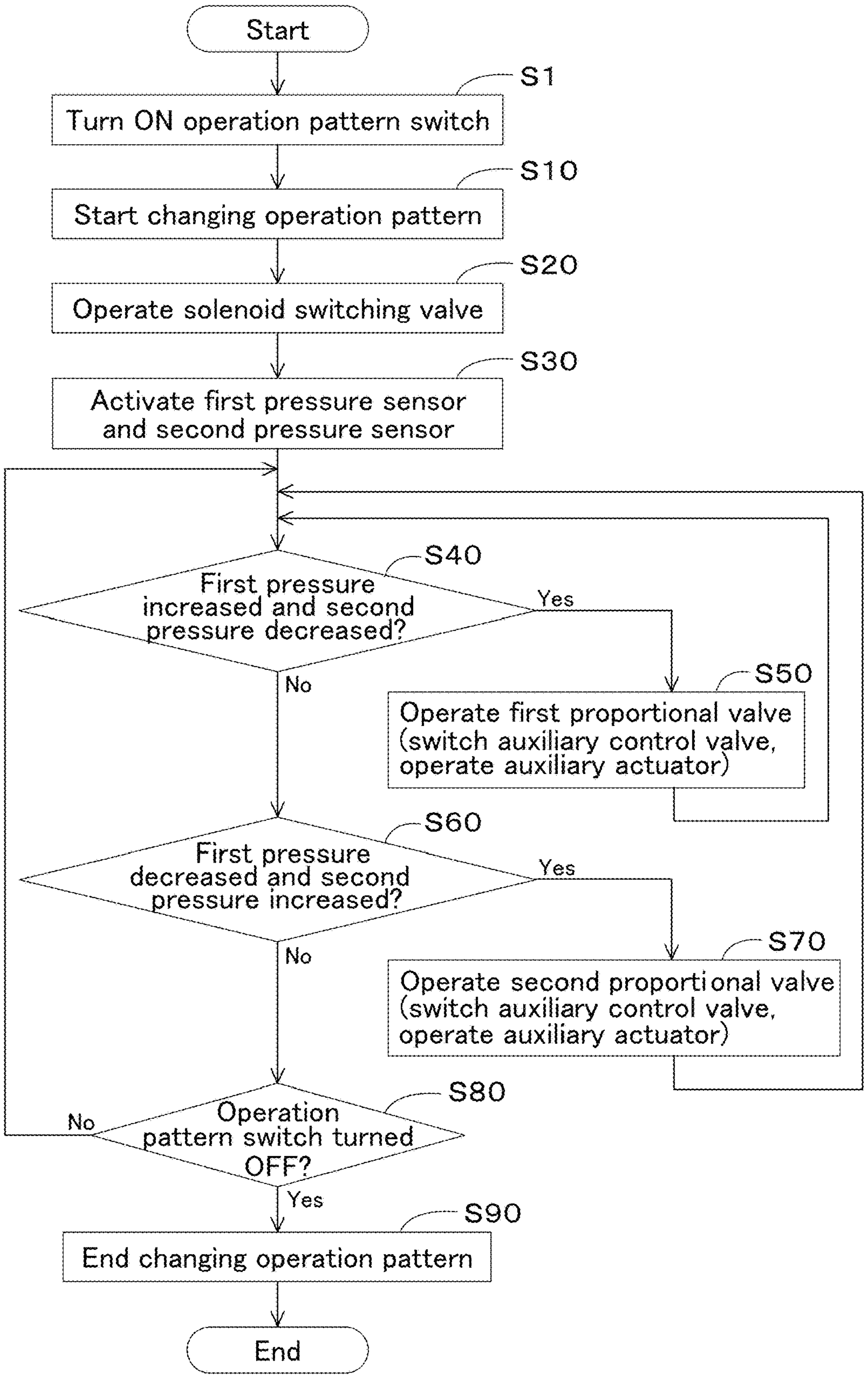
FIG. 2 is a flowchart illustrating operation of a hydraulic system for a working system according to an example embodiment of the present invention.

A change of the operation pattern in the hydraulic system according to the present example embodiment will be described with reference to FIG. 2. FIG. 2 is a flowchart illustrating operations of individual portions or elements of the hydraulic system of the working system according to the present example embodiment.

In response to the operation pattern switch 95 being turned ON while the prime mover 32 is being driven and the working machine 1 is in a normal operation state (step S1), the controller 90 starts changing the operation pattern of the operation lever 58 (step S10).

After step S10, the controller 90 continuously energizes the solenoid of the solenoid switching valve 110 to switch the solenoid switching valve 110 to the first position 110*a* (step S20). In response to the solenoid switching valve 110 being switched to the first position 110*a*, a pilot pressure acts on the pressure receiver of the blocking switching valve 100. Accordingly, the blocking switching valve 100 is switched to the blocking position 100*a*, and the fluid passages 45*c* and 45*d* are blocked.

After step S20, the controller 90 activates the pressure sensor 120*a*, which is a second pressure sensor, and the pressure sensor 120*b*, which is a first pressure sensor (step S30). Accordingly, the pressure sensors 120*a* and 120*b* start measuring the hydraulic pressures in the fluid passages 45*d* and 45*c*, respectively.

After step S30, for example, the controller 90 detects that the hydraulic pressure in the fluid passage 45*c* (first pressure) detected by the pressure sensor 120*b* has increased and that the hydraulic pressure in the fluid passage 45*d* (second pressure) detected by the pressure sensor 120*a* has decreased (Yes in step S40). In this case, the controller 90 increases the opening of the first proportional valve 60A provided in the pilot fluid passage 86*a*, in accordance with the first pressure detected by the pressure sensor 120*b* (step S50). Accordingly, a pilot pressure is applied to the pressure receiver 61*a* of the auxiliary control valve 56C, the spool of the auxiliary control valve 56C is moved, the auxiliary control valve 56C is switched to the first supply position 62*a*, and the auxiliary actuator is operated.

If the controller 90 detects neither an increase in the hydraulic pressure in the fluid passage 45*c* (first pressure) nor a decrease in the hydraulic pressure in the fluid passage 45*d* (second pressure) (No in step S40), the process proceeds to step S60.

After step S40, for example, the controller 90 detects that the hydraulic pressure in the fluid passage 45*c* (first pressure) detected by the pressure sensor 120*b* has decreased and that the hydraulic pressure in the fluid passage 45*d* (second pressure) detected by the pressure sensor 120*a* has increased (Yes in step S60). In this case, the controller 90 increases the opening of the second proportional valve 60B provided in the pilot fluid passage 86*b*, in accordance with the second pressure detected by the pressure sensor 120*a* (step S70). Accordingly, a pilot pressure is applied to the pressure receiver 61*b* of the auxiliary control valve 56C, the spool of the auxiliary control valve 56C is moved, the auxiliary control valve 56C is switched to the first supply position 62*b*, and the auxiliary actuator is operated.

If the controller 90 detects neither a decrease in the hydraulic pressure in the fluid passage 45*c* (first pressure) nor an increase in the hydraulic pressure in the fluid passage 45*d* (second pressure) (No in step S60), the process proceeds to step S80.

In response to the operation pattern switch 95 being turned OFF (Yes in step S80), the controller 90 ends changing the operation pattern of the operation lever 58 (step S90). If the operation pattern switch 95 is not turned OFF (No in step S80), the process returns to step S40, and the controller 90 continues changing the operation pattern of the operation lever 58.

In steps S50 and S70, the controller 90 increases the opening of the first proportional valve 60A and the opening of the second proportional valve 60B in accordance with the first pressure and the second pressure detected by the pressure sensors 120*b* and 120*a*, respectively. At this time, the controller 90 may make the opening of the first proportional valve 60A proportional to the magnitude of the first pressure, may make the opening of the second proportional valve 60B proportional to the magnitude of the second pressure, or may perform control in accordance with a predetermined function having the first pressure and/or the second pressure as a variable. The relationship between the first pressure and the opening of the first proportional valve 60A and the relationship between the second pressure and the opening of the second proportional valve 60B can be determined as appropriate in accordance with characteristics of the working machine 1 or characteristics of the operation device of the working machine 1.

As described above, according to the hydraulic system for the working machine according to the present example embodiment, the operation target of the operation lever 58 can be changed from the boom control valve 56A and the bucket control valve 56B to the boom control valve 56A and the auxiliary control valve 56C. This is referred to as a change of an operation pattern, but the change of the operation pattern is not limited to the configuration of the above-described example embodiment.

As described in the present example embodiment, the technique and idea of blocking a pilot fluid passage with a configuration corresponding to the blocking switching valve 100 and the solenoid switching valve 110 and controlling a configuration corresponding to the first proportional valve 60A and the second proportional valve 60B on the basis of a change in the hydraulic pressure of the pilot fluid passage can be applied to various portions or elements of the hydraulic system for the working machine.

For example, in the present example embodiment, the blocking switching valve 100 is provided across the fluid passages 45*c* and 45*d*. Alternatively, the blocking switching valve 100 may be provided across the fluid passages 45*a* and 45*b*. Accordingly, the pressure sensors 120*a* and 120*b* may be provided, in the fluid passages 45*a* and 45*b*, between the operation lever 58 and the blocking switching valve 100. With this configuration, the controller 90 is capable of controlling the first proportional valve 60A and the second proportional valve 60B by operating the operation lever 58 in a forward-rearward direction.

Figure 3:
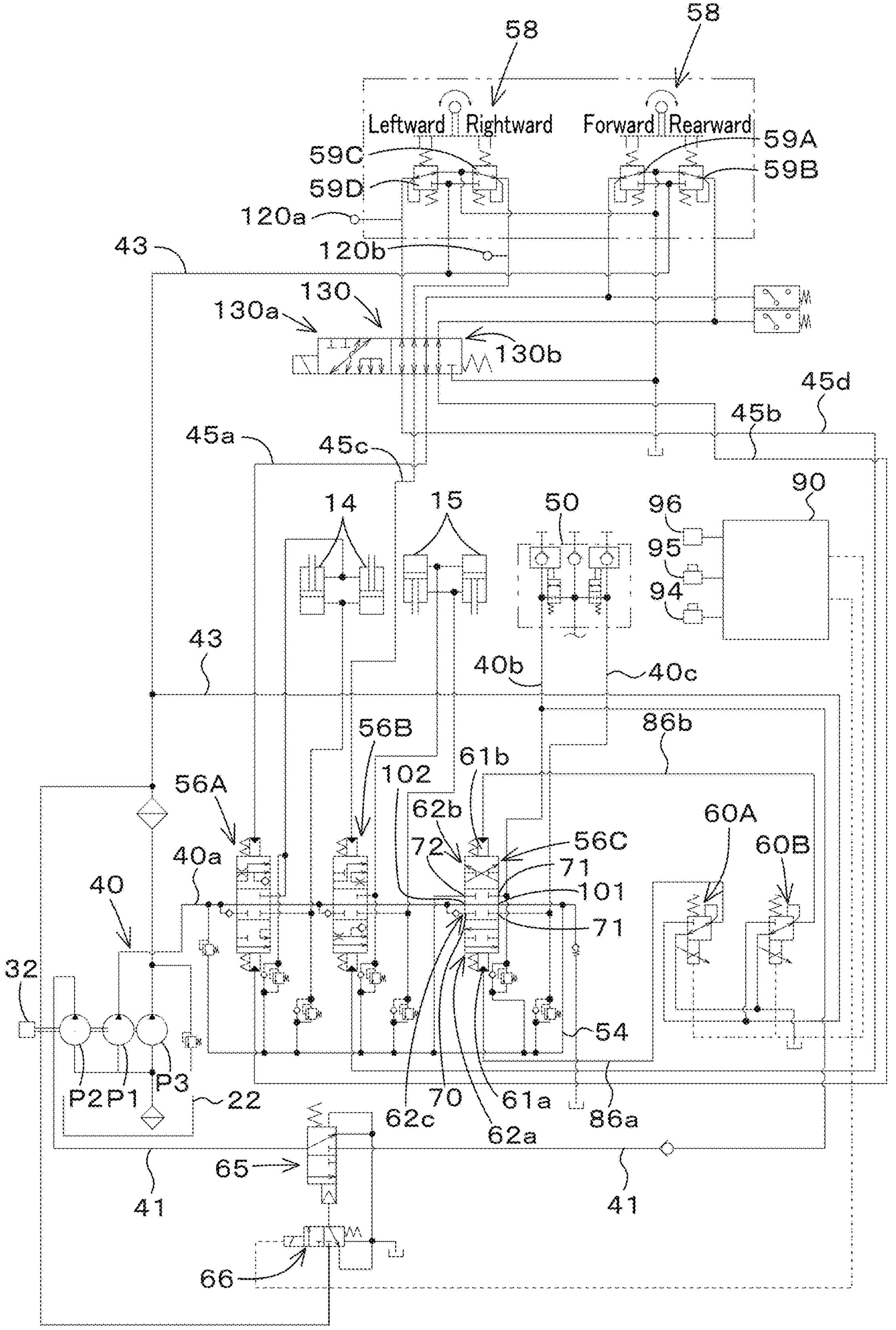
FIG. 3 is a schematic diagram of a hydraulic system for a working machine according to a modification of an example embodiment of the present invention.

A modification of the present example embodiment will be described with reference to FIG. 3. FIG. 3 is a schematic diagram of a hydraulic system for a working machine according to a modification of the present example embodiment. The hydraulic system illustrated in FIG. 3 has a configuration slightly different from the configuration of the hydraulic system illustrated in FIG. 1. In the hydraulic system illustrated in FIG. 3, a solenoid blocking switching valve 130 is provided instead of the blocking switching valve 100 and the solenoid switching valve 110 illustrated in FIG. 1.

Hereinafter, the solenoid blocking switching valve 130 will be described. The solenoid blocking switching valve 130 is provided across both the fluid passage (third pilot fluid passage) 45*a* and the fluid passage (fourth pilot fluid passage) 45*b* that connect the operation lever 58 and the boom control valve 56A, and is provided across both the fluid passage (first pilot fluid passage) 45*c* and the fluid passage (second pilot fluid passage) 45*d* that connect the operation lever 58 and the bucket control valve 56B. The solenoid blocking switching valve 130 is a valve capable of blocking and unblocking the fluid passages 45*a*, 45*b*, 45*c*, and 45*d*.

The solenoid blocking switching valve 130 is a two-position switching valve including a solenoid switching valve. The solenoid blocking switching valve 130 is switchable between two switching positions (a blocking position 130*a* and an unblocking position 130*b*) as a result of the solenoid being energized or deenergized.

In the blocking position 130*a*, the solenoid blocking switching valve 130 blocks the fluid passages 45*c* and 45*d* between the pilot valves 59C and 59D and makes the flow rate of the pilot fluid flowing from the pilot valves 59C and 59D to the bucket control valve 56B zero.

In the blocking position 130*a*, the solenoid blocking switching valve 130 connects the fluid passage 45*a* connected to the pilot valve 59A to the fluid passage (first pilot fluid passage) 45*c*. This makes it possible to supply a pilot fluid from the pilot valve 59A to the bucket control valve 56B. Furthermore, in the blocking position 130*a*, the solenoid blocking switching valve 130 connects the fluid passage 45*b* connected to the pilot valve 59B to the fluid passage (second pilot fluid passage) 45*d*. This makes it possible to supply a pilot fluid from the pilot valve 59B to the bucket control valve 56B.

In the unblocking position 130*b*, the solenoid blocking switching valve 130 unblocks the fluid passages 45*a* and 45*b* to allow a pilot fluid to be supplied to the boom control valve 56A, and unblocks the fluid passages 45*c* and 45*d* to allow a pilot fluid to be supplied to the bucket control valve 56B. In other words, the solenoid blocking switching valve 130 causes portions near the operation lever 58 of the fluid passages 45*a* and 45*b* to communicate with the fluid passages 45*c* and 45*d* when being in the blocking position 130*a*, and causes the fluid passages 45*a*, 45*b*, 45*c*, and 45*d* to communicate with each other when being in the unblocking position 130*b*.

When the solenoid blocking switching valve 130 is in the blocking position 130*a*, the fluid passages 45*a* and 45*b* connected to the boom control valve 56A communicate with, in the solenoid blocking switching valve 130, the hydraulic fluid tank 22 or suction ports of the first hydraulic pump P1, the second hydraulic pump P2, and the third hydraulic pump P3, and thus the pilot pressure acting on the boom control valve 56A becomes zero.

Thus, when the solenoid blocking switching valve 130 is in the blocking position 130*a*, the pilot fluid output from the pilot valves 59C and 59D of the operation lever 58 is blocked by the solenoid blocking switching valve 130 in the fluid passages 45*c* and 45*d*. Then, upon a pilot fluid being output from the pilot valves 59C and 59D by an operation of the operation lever 58, the hydraulic pressure in the section from the pilot valves 59C and 59D to the blocking position 130*a* increases in the fluid passages 45*c* and 45*d*.

Furthermore, when the solenoid blocking switching valve 130 is in the blocking position 130*a*, a pilot fluid can be supplied from the pilot valve 59A to the bucket control valve 56B, and a pilot fluid can be supplied from the pilot valve 59B to the bucket control valve 56B.

Switching between the blocking position 130*a* and the unblocking position 130*b* in the solenoid blocking switching valve 130 is performed by the controller 90. The operation pattern switch 95, such as a switch that can be turned ON or OFF, described in the above example embodiment is connected to the controller 90. The operation pattern switch 95 outputs an instruction to operate the solenoid blocking switching valve 130 to the controller 90. When the operation pattern switch 95 is in an OFF state, the controller 90 deenergizes the solenoid of the solenoid blocking switching valve 130. When the operation pattern switch 95 is in an ON state, the controller 90 continuously energizes the solenoid of the solenoid blocking switching valve 130.

In response to the solenoid of the solenoid blocking switching valve 130 being energized, the solenoid blocking switching valve 130 is switched to the blocking position 130*a*. In response to the solenoid of the solenoid blocking switching valve 130 being deenergized, the solenoid blocking switching valve 130 is switched to the unblocking position 130*b*.

The configuration and disposition of the pressure sensor 120*b*, which is a first pressure sensor, and the pressure sensor 120*a*, which is a second pressure sensor, are similar to the configuration and disposition described in the above example embodiment.

According to the hydraulic system of the above-described modification, when the solenoid blocking switching valve 130 is in the blocking position 130*a*, the operation target of the operation lever 58 can be changed from the bucket control valve 56B to the auxiliary control valve 56C. In addition, when the solenoid blocking switching valve 130 is in the blocking position 130*a*, a pilot fluid can be supplied from the pilot valve 59A to the bucket control valve 56B, and a pilot fluid can be supplied from the pilot valve 59B to the bucket control valve 56B. Thus, the operation target of the operation lever 58 can be changed from the boom control valve 56A to the bucket control valve 56B.

The hydraulic system illustrated in FIG. 1 according to the above-described example embodiment and the hydraulic system illustrated in FIG. 3 according to the modification each include an operation switch 96 for operating the auxiliary actuator. The operation switch 96 includes, for example, a swingable seesaw switch, a slidable slide switch, or a pushable push switch. The operation switch 96 is provided near the operator's seat 8 and is connected to the controller 90.

The connection member 50 includes an auxiliary power supply port (also referred to as an external power supply port) to supply power to control a switching valve of the auxiliary attachment connected to the connection member 50. Illustration of the auxiliary power supply port is omitted.

The auxiliary power supply port is connected to the controller 90, and the controller 90 controls the voltage to be applied to the auxiliary power supply port. In this configuration, in a first operation mode, the first proportional valve 60A and the second proportional valve 60B are operated by the operation switch 96 when the solenoid blocking switching valve 130 is in the unblocking position 130*b*. In response to the operation switch 96 being operated, the controller 90 operates the first proportional valve 60A and the second proportional valve 60B by outputting a voltage in accordance with the direction and amount of the operation of the operation switch 96, and switches the auxiliary control valve 56C.

At this time, the controller 90 ignores the output values of the pressure sensor 120*a* and the pressure sensor 120*b*. Alternatively, the controller 90 may use the output values of the pressure sensor 120*a* and the pressure sensor 120*b* for control other than control of the first proportional valve 60A and the second proportional valve 60B.

In a second operation mode, when the solenoid blocking switching valve 130 is in the blocking position 130*a* and the controller 90 is not detecting an operation of the operation switch 96, the controller 90 controls the first proportional valve 60A and the second proportional valve 60B in accordance with the output values of the pressure sensor 120*a* and the pressure sensor 120*b* as described above. At this time, the controller 90 sets the voltage to be applied to the auxiliary power supply port to zero.

In a third operation mode, when the solenoid blocking switching valve 130 is in the blocking position 130*a* and the controller 90 is detecting an operation of the operation switch 96, the controller 90 operates the first proportional valve 60A and the second proportional valve 60B by outputting a voltage in accordance with the direction and amount of the operation of the operation switch 96, and switches the auxiliary control valve 56C. In addition, the controller 90 applies a voltage to the auxiliary power supply port. As a result of applying a voltage to the auxiliary power supply port, a switching valve of the auxiliary attachment is switched, and the actuator connected to the switching valve is operated.

As described above, as a result of making the voltage to be applied to the auxiliary power supply port in the second operation mode different from the voltage to be applied to the auxiliary power supply port in the third operation mode, two hydraulic actuators provided in the auxiliary attachment can be operated by the first proportional valve 60A and the second proportional valve 60B.

Although it has been described that the controller 90 sets the voltage to be applied to the auxiliary power supply port to zero in the second operation mode and applies a voltage to the auxiliary power supply port in the third operation mode, the controller 90 may apply a voltage to the auxiliary power supply port in the second operation mode and set the voltage to be applied to the auxiliary power supply port to zero in the third operation mode. Also with this configuration, the two hydraulic actuators provided in the auxiliary attachment can be operated by the first proportional valve 60A and the second proportional valve 60B.

However, if the controller 90 detects an operation of the operation switch 96 and output values of the pressure sensor 120*a* and the pressure sensor 120*b*, the controller 90 preferentially executes the second operation mode.

According to the configurations described in the present example embodiment and the modification, the controller 90 is capable of controlling not only solenoid proportional valves exemplified by the first proportional valve 60A and the second proportional valve 60B but also various components that are electrically controlled, on the basis of a change in the pressures of the pressure sensors 120*a* and 120*b*. Thus, the change of the operation pattern described in the present example embodiment can be applied to not only the working-system hydraulic circuit according to the present example embodiment but also a traveling-system hydraulic circuit.

In the above-described example embodiment, a description has been given of the configuration in which an object other than an object to be originally operated can be moved by changing control in accordance with a change in pilot pressure also in a hydraulic pilot circuit, but the present invention is not limited to the above-described configuration. For example, a pressure switch may be used, instead of a pressure sensor, as a detector for a pilot pressure, to turn ON/OFF an auxiliary control valve. In addition, although pilot fluid passages are blocked by a blocking switching valve in the above-described example embodiment, an operation (for example, an operation of applying a current to a proportional valve or the like to operate the auxiliary control valve) may be performed while an object to be originally operated is operated by the operation lever, without blocking the pilot fluid passages.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a prime mover;
an actuation hydraulic pump to be driven by the prime mover to output hydraulic fluid;
a pilot hydraulic pump to be driven by the prime mover to output pilot fluid;
a first control valve to be actuated by the pilot fluid to control supply of the hydraulic fluid to a first hydraulic actuator to cause the first hydraulic actuator to actuate a first device;
a second control valve to be actuated by the pilot fluid to control supply of the hydraulic fluid to a second hydraulic actuator to cause the second hydraulic actuator to actuate a second device;
an operation device to allow the pilot fluid to be output based on an operation state of the operation device;
a first pilot fluid passage to allow the pilot fluid to be supplied from the operation device to the first control valve;

a second pilot fluid passage to allow the pilot fluid to be supplied from the operation device to the second control valve;

a pressure detector to detect a pilot pressure which is a pressure of the pilot fluid in the first pilot fluid passage;

a blocking switching valve provided in the first pilot fluid passage;

a solenoid valve provided in the second pilot fluid passage; and a controller configured or programmed to control actuation of the blocking switching valve and the solenoid valve; wherein the controller is configured or programmed to:

cause the blocking switching valve to unblock the first pilot fluid passage to perform switching to a first operation pattern in which the operation device operates the first device via the first control valve and the first hydraulic actuator; and cause the blocking switching valve to block the second pilot fluid passage and control the solenoid valve based on the pilot pressure detected by the pressure detector to perform switching to a second operation pattern in which the operation device operates the second device via the second control valve and the second hydraulic actuator.

2. The working machine according to claim 1, further comprising:

a plurality of the first pilot fluid passages; and a plurality of the pressure detectors which are pressure sensors provided in the respective plurality of first pilot fluid passages between the operation device and the blocking switching valve.

3. The working machine according to claim 1, further comprising:

a third control valve to be actuated by the pilot fluid to control supply of the hydraulic fluid to a third hydraulic actuator to cause the third hydraulic actuator to actuate a third device; and a third pilot fluid passage to allow the pilot fluid to be supplied from the operation device to the third control valve; wherein the operation device is configured to operate the first device via the first control valve and the first hydraulic actuator in the first operation pattern and the second operation pattern.

4. The working machine according to claim 3, further comprising:

a working device attached to a machine body; wherein the working device includes:

a boom; and a boom cylinder to raise and lower the boom;

the third device is the boom; and the third hydraulic actuator is the boom cylinder.

5. The working machine according to claim 1, further comprising:

an operator's seat to allow an operator to be seated; wherein the operation device includes:

an operation lever adjacent to the operator's seat to be operated in a plurality of directions; and pilot valves to change a pressure of the pilot fluid based on a direction and amount of operation of the operation lever.

6. The working machine according to claim 1, wherein the solenoid valve includes a proportional valve; and the controller is configured or programmed to, after performing switching to the second operation pattern, control the proportional valve based on the pilot pressure detected by the pressure detector to change a pressure of the pilot fluid acting on the second control valve to actuate the second control valve.

7. The working machine according to claim 1, further comprising;

a working device attached to a machine body; wherein the working device includes:

a boom;

a working tool attached to the boom; and a hydraulic cylinder to swing the working tool; wherein the first device is the working tool;

the first hydraulic actuator is the hydraulic cylinder;

the second device is an attachment attached to the boom; and the second hydraulic actuator is an auxiliary actuator attached to the attachment.

8. The working machine according to claim 1, further comprising:

an operation pattern switch; wherein the controller is configured or programmed to actuate the blocking switching valve based on an operation state of the operation pattern switch to perform switching to the first operation pattern or the second operation pattern.

* * * * *